United States Patent [19]

Mollere

[11] 4,402,382
[45] Sep. 6, 1983

[54] AIR GUN FIRE TIME SENSOR

[75] Inventor: John C. Mollere, Houston, Tex.

[73] Assignee: Litton Resources Systems, Inc., Houston, Tex.

[21] Appl. No.: 262,110

[22] Filed: May 11, 1981

[51] Int. Cl.³ .............................................. G01V 1/38
[52] U.S. Cl. .................................... 181/120; 181/107; 181/119; 367/144; 367/185
[58] Field of Search ............... 181/107, 120, 111, 103, 181/119; 367/55, 144, 185; 73/652; 340/58, 626

[56] References Cited

U.S. PATENT DOCUMENTS

| | | | |
|---|---|---|---|
| 3,370,672 | 2/1968 | Eberlan | 181/119 |
| 3,638,752 | 2/1972 | Wakefield | 181/107 |
| 4,034,827 | 7/1977 | Leerskov, Jr. et al. | 181/120 |
| 4,047,591 | 9/1977 | Ward et al. | 181/119 |
| 4,114,723 | 9/1978 | Paitson et al. | 181/120 |
| 4,134,097 | 1/1979 | Cowles | 181/102 |
| 4,210,222 | 7/1980 | Chelminski et al. | 181/107 |
| 4,211,300 | 7/1980 | Miller | 181/120 |
| 4,240,518 | 12/1980 | Chelminski | 181/107 |

Primary Examiner—T. H. Tubbesing
Assistant Examiner—K. R. Kaiser
Attorney, Agent, or Firm—William A. Knox

[57] ABSTRACT

A robust air gun fire time sensor consists of a housing to which is secured a protruding nonmagnetic internal barrel having a bore. The bore is closed at one end by a magnetic end cap defining an air chamber and the bore is in fluid communication with the firing chamber of an air gun. A generator coil surrounds the barrel. A bar magnet is floatingly mounted inside the bore and is urged against a shoulder formed in the end cap. When the air gun is charged with compressed air, some of the air becomes entrapped in the air chamber. When the air gun is fired, the entrapped compressed air in the air chamber pushes the bar magnet away from the shoulder. The collapsing magnetic field creates a transient electric pulse in the generator coil.

6 Claims, 1 Drawing Figure

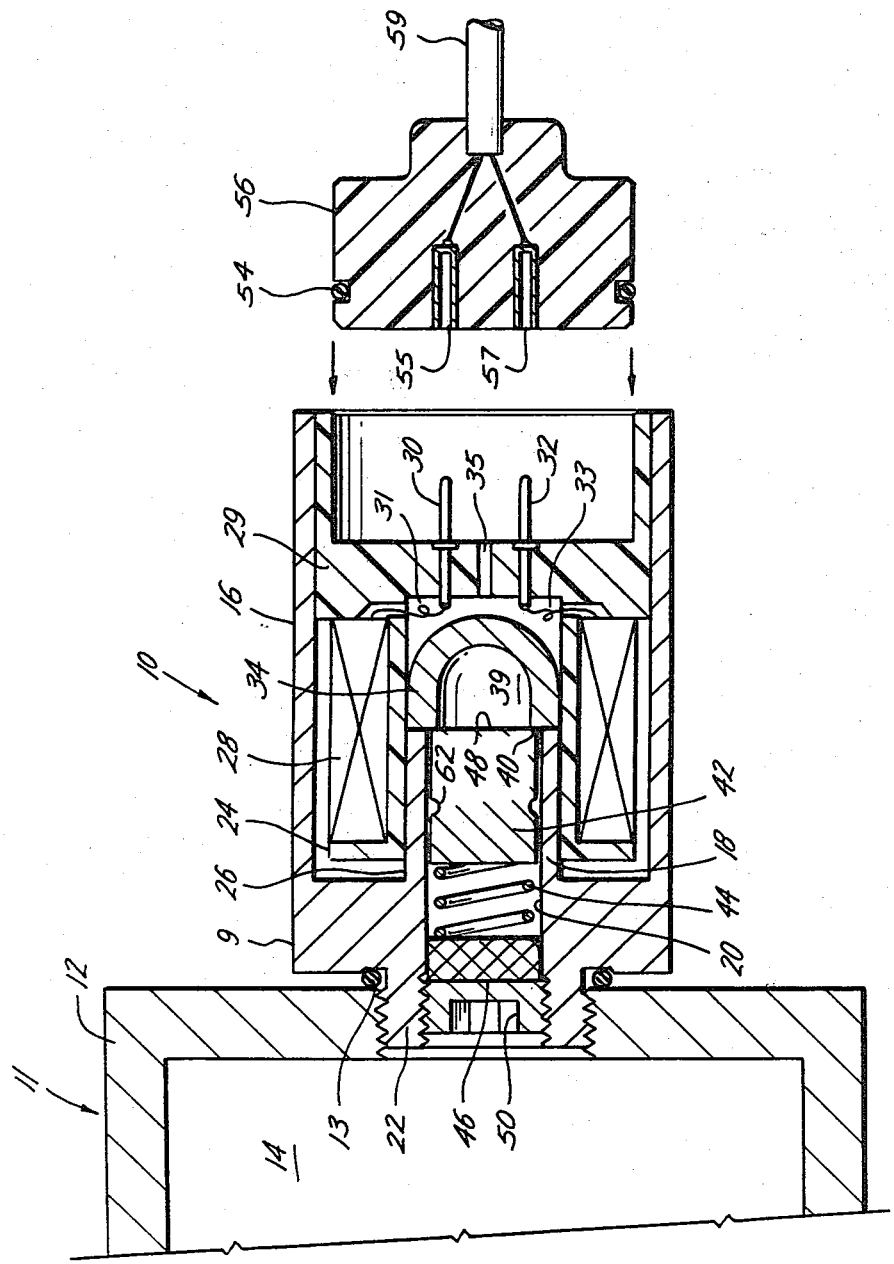

AIR GUN FIRE TIME SENSOR

BACKGROUND OF THE INVENTION

1. Field of the Invention

This invention relates to means for determining the firing instant of an air gun such as is commonly used in marine seismic surveying for sub-ocean economic minerals, U.S. Class 181/107 and/or 181/120.

2. Discussion of the Prior Art

Air guns have become a standard sound source for marine seismic reflection and refraction exploration. Used singly or in arrays, air guns are compact, economical to operate and versatile as to tailoring of the power and spectral energy content of the acoustic signal to environmental needs.

Accurate computation of the depth of subsurface earth layers is critically dependent upon an accurate measurement of the travel time of a reflected or refracted acoustic wave between the source, such as an air gun, and the acoustic-wave receivers, such as hydrophones. Accordingly, the instant of firing an air gun must be known with a precision that is greater than the data-sampling-rate error, assuming of course that digital data recording is employed.

In principle, all air guns employ some sort of valving means to abruptly release a volume of high-pressure air or other compressible fluid from a chamber, through exhaust ports, into the surrounding water. The firing instant of the gun is measured in various ways. In a primitive method, a pressure detector is fastened two or three feet away from the exhaust ports. When the gun is fired, the resulting near-field shock wave is sensed by the pressure transducer as a sharp pressure increase. That method has the disadvantage that the location of the pressure transducer relative to the exhaust ports is seldom known with exactitude. Therefore, there is an unknown time delay between the time the gun fires and the time that the shock wave is sensed. Another disadvantage is that the shock wave often damages or destroys the active element of the detector which is usually of the piezo-electric type.

The air-release valve of air guns used in seismic operations is generally electrically triggered. Although at first glance, one would think that the trigger pulse itself might be used as the fire-time instant (time break), mechanical variations in the gun itself such as dimensional tolerance variations, friction, etc., cause the use of the trigger pulse as a time break to be unreliable. That problem is particularly serious when an array of guns must be fired in synchronism.

Another type of time break detector involves use of an electromagnetic or electrostatic means mounted on or in the gun to detect motion of the valve member itself. Such detectors provide an electrical transient when the valve member just begins or just ends its travel to uncover the exhaust ports. I have discovered that installation of such a device, usually inside the gun, requires extensive modifications to the gun body and it tends to be somewhat complicated. Field maintenance is difficult and costly because the entire gun must be disassembled to make repairs. Furthermore, the time that the gun fires is not necessarily coincident with the beginning or ending of the valve motion. The valve members of certain types of guns may be made of a non-magnetic material such as aluminum or titanium to save weight. Or the valve may be non-metallic. Use of an electro-magnetic or electrostatic detector is not practical in such cases.

In certain types of air guns, when the valve member is triggered, it necessarily rapidly accelerates to a relatively high velocity in order to provide the required abrupt air release. At the end of its stroke, the valve must be decelerated, usually against an air cushion that is formed in a separate chamber in the gun.

In another type of time-break detector, a pressure detector is exposed to the interior of the deceleration chamber and detects the air pressure rise in the chamber as the valve member compresses the air cushion. The detector output is displayed as an electrical transient pulse. I have discovered that because the valve member must decelerate at a finite rate, the leading edge of the transient pulse necessarily exhibits a relatively slow rise time so that the exact onset time of the pulse will tend to be fuzzy and difficult to pinpoint. I have also found that the internal pressure detector is subjected to repeated shocks in accordance with the firing-repetition rate of the gun. The lifetime of commercial piezo-electric detectors, such as is recommended in U.S. Pat. No. 4,210,222, for example, is very short. The detectors must be frequently replaced.

U.S. Pat. Nos. 3,034,827; 4,047,591; 4,210,222 and 4,240,518 are incorporated herein by reference as showings of known time-break detectors.

U.S. Pat. Nos. 3,638,752, 4,211,300 and 4,114,723 are incorporated herein by reference, and, along with the other three patents are representative of alternate air gun designs.

SUMMARY OF THE INVENTION

It is an object of this invention to provide a time-break sensor for an air gun that is mounted externally of the air gun for accurately recording the exact firing time thereof.

It is another object of this invention to provide a time break sensor that is robust under the stress of repeated air gun firings and one that is easily removed for repair or replacement without violating the integrity of the air gun structure.

In an embodiment of this invention, the sensor consists of a nonmagnetic housing closed at one end, the other end having a threaded pipe fitting secured thereto for screwing into a port that fluidly communicates with the firing chamber of an air gun. The pipe fitting includes a nonmagnetic elongated barrel, having a bore, which protrudes into the housing. The barrel, which may be cylindrical is closed at one end by an air filter mounted in the bore of the barrel. The end of the barrel that protrudes into the housing is closed by a magnetic end cap having a shoulder and including an air chamber. A bar magnet is mounted for sliding motion lengthwise within the barrel bore. A spring, mounted between the bar magnet and the air filter, urges the other face of the magnet against the end-cap shoulder to close a magnetic circuit through the end-cap. A generator coil is wound around the outer circumference of the barrel. When the pressure in the firing chamber suddenly decreases when the gun fires, the residual, higher air pressure in the air chamber momentarily snaps the bar magnet away from the shoulder of the end-cap breaking the magnetic circuit. As the magnetic field collapses, a sharp electrical pulse is generated in the coil.

BRIEF DESCRIPTION OF THE SOLE DRAWING

A better understanding of this invention may be had by reference to the detailed description of a preferred embodiment and to the sole drawing of a Fire-time Sensor for an Air Gun shown in cross-sectional view, attached to the firing chamber of an air-gun.

DETAILED DESCRIPTION OF A PREFERRED EMBODIMENT

Referring now to the sole FIGURE, there is shown the air gun fire-time sensor 10 of this invention, secured, as by screwing, to a wall 12 of the firing chamber 14 of an air gun. The air gun may be of any known type such as, for example, the gun shown in FIG. 2 of U.S. Pat. No. 4,114,723, assigned to the assignee of this invention.

Structurally, the air gun fire-time sensor (hereinafter referred to as "the sensor") 10 consists of a hollow housing 9 having an outer wall 16, a protruding inner barrel 18 secured to housing 9, having a bore 20, and an external threaded pipe fitting or stud 22. The housing, the barrel and the stud may be cylindrical and preferably are machined from a single bar of a non-magnetic material which may be 304 stainless steel.

An insulating coil form 24, which may be made of nylon, fits around the outer wall 26 of barrel 18. Several hundred turns, preferably between 400 and 800, of #34AWG copper wire are wound around the coil form to form a generator coil 28. Coil form 24 is integral with plug body 29 which acts as a support for male contacts 30 and 32 as well as a moisture barrier to prevent water leakage around generator coil 24. The wire ends 31 and 33 of generator coil 28 are soldered to contacts 30 and 32 by conventional means, the wires being passed through suitable holes in plug body 29. A vent hole 35 is drilled in plug body 29 to vent the air inside housing 9 when plug body 29 is pressed into place around barrel 18. The vent hole is later sealed by conventional means.

A hollow end cap 34 is welded to the protruding end of barrel 18. The hollow end cap 34 forms an air chamber 39 and includes an inner shoulder 40. End cap 34 is made of a magnetic but non-magnetizable metal such as 17-4PH stainless steel. That is, the metal will support a magnetic path in the presence of a magnetic pole but the metal will retain no residual magnetism of its own when the magnetic pole is removed.

A bar magnet 42 of Alnico V alloy floats inside bore 20 of barrel 18 and is slidable lengthwise along the longitudinal axis of the barrel. A clearance of −0.002 inch is allowed between the bar magnet and the wall of bore 20. The small clearance defines a restriction to the flow of air into and out of the air chamber 39. A spring 44, backed by a sintered-metal air filter 46 urges the face 48 of bar magnet 42 against shoulder 40 of end cap 34. A hollow threaded bushing 50 holds the spring 44 and air filter 46 in place in a conventional manner.

A waterproof plug 56, having female contacts 55 and 57 is insertable into the open end of sensor housing 9. An O-ring 54 creates a watertight seal when the plug is in place. Female contacts 55 and 57 of course, mate with male contacts 30 and 32. When plug 56 is mated to housing 9, a two conductor cable 59 receives the electrical output signals from generator coil 28 and transmits the signals to a suitable recording device, not shown.

In use, a suitable port is drilled and tapped in the wall 12 of the firing chamber such as chamber 14 of an air gun 11, shown schematically only in part. Refer to the above cited patents for construction details. The stud 22 of sensor 10 is screwed externally of the chamber into the drilled, tapped port. A fluid-tight seal between the sensor 10 and the air gun wall 12 is provided by a gasket 13 of a conventional high pressure type. When firing chamber 14 is filled with air or other fluid at high pressure of say, 2000 to 6000 psi, the air will leak around bar magnet 42 through the space or restriction between it, and the wall of bore 20 to provide pressurized air in air chamber 39. When the pressures in firing chamber 14 and air chamber 39 equalize, face 48 of bar magnet 42 is pressed tightly by spring 44 against end cap shoulder 40 which acts as a pole piece creating a low reluctance magnetic circuit.

When gun 11 is fired, an abrupt pressure drop occurs in the firing chamber. At that instant, the relative overpressure in air chamber 39 momentarily urges bar magnet face 48 against the spring 44, away from end cap shoulder 40, breaking the magnetic circuit therebetween. The abrupt collapse of the magnetic field induces a voltage in coil winding 28 which appears as an output electrical transient signal at terminals 30 and 32 of plug 56 in the form of a pulse that I have discovered to exhibit a very fast rise time. Typically, the peak voltage is on the order of 2 volts or more. To obtain a maximum output signal, it is essential that generator coil 28 be mounted symmetrically with respect to shoulder 40, preferably centered. That output signal may be sent to a data recorder or other instrument by output cable 59 as earlier mentioned. In the context of this invention, I intend the term "fast rise time" to mean that the voltage rises to peak output within a time interval less than 50 microseconds. By way of contrast, the rise time of a prior-art time break may be on the order of 0.5 millisecond or 500 microseconds. See for example, U.S. Pat. No. 4,034,827 and 4,047,591 and FIGS. 9 and 10 thereof.

The clearance between bar magnet 42 and the wall of bore 20 is small so that there will exist a substantial resistance or restriction to outflow of air from chamber 39 back into firing chamber 14 when the air gun is fired. An air-flow restriction is essential so that bar magnet 42 will be positively displaced before the residual-air overpressure in chamber 39 dissipates. Although not essential, one or more grooves such as 62 may be cut around the circumference of bar magnet 42 to increase the turbulence of the escaping air and hence also its viscous friction. Because of the small clearance between the bar magnet and the bore wall, sintered metal air filter 46 is necessary to keep the moving parts of sensor 10 free of the dirt and rust that usually accumulates in the firing chamber of an air gun.

I have disclosed a simple, robust, external fire-time sensor that is inexpensive, easy to remove and replace and one that provides an unequivocally sharp time-break event.

Other variations and embodiments of this invention will come to mind in those skilled in the art which will fall within the scope and spirit of the above described embodiment which is exemplary only and is limited only by the appended claims.

I claim:

1. A fire time sensor for attachment to an air gun of the type having a firing chamber for receiving pressurized air and means for impulsively releasing said pressurized air, thereby developing a pressure drop in said firing chamber, comprising:

a hollow non-magnetic housing;

an elongated non-magnetic barrel including a bore, having a wall, extending longitudinally therethrough, secured at one end to the housing, the other end of said barrel protruding into said housing;

a generator coil having signal output leads mounted on said barrel;

a magnetic end cap having a shoulder for closing the bore at the protruding end of the barrel;

a bar magnet floatingly mounted for longitudinal movement inside said bore;

means for urging said bar magnet against said shoulder;

means for securing the housing to said firing chamber; and means for providing fluid communication between said firing chamber and said bore.

2. The fire time sensor as defined by claim 1, comprising:

an air filter mounted between said firing chamber and said bore.

3. The fire time sensor as defined by claim 1, wherein said housing is detachably secured externally of said firing chamber.

4. The fire time sensor as defined by claim 1, comprising:

an air chamber in said end cap for receiving a charge of pressurized air from said firing chamber through said bore;

resilient means for urging said bar magnet against said shoulder for completing a magnetic circuit, said bar magnet having two end faces, the first of which is exposed to the air-chamber pressure, the second of which is exposed to the firing-chamber pressure so that when the air gun is fired, resulting in a concomitant abrupt pressure drop in said firing chamber, the relative over pressure in said air chamber forces said bar magnet momentarily against said resilient means, breaking said magnetic circuit thereby to generate a transient electrical pulse in said generator coil.

5. The fire time sensor as defined in claim 4 comprising:

means in said bore restricting the outflow of air from said air chamber.

6. The fire time sensor as defined in claim 5 wherein the air outflow restriction is defined by the clearance between said bar magnet and the wall of said bore.

* * * * *